Jan. 9, 1951
J. V. BERTRAND
2,537,182
INJECTION MOLDING MACHINE
Filed Sept. 23, 1946
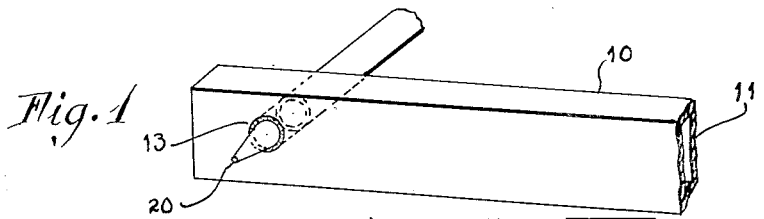
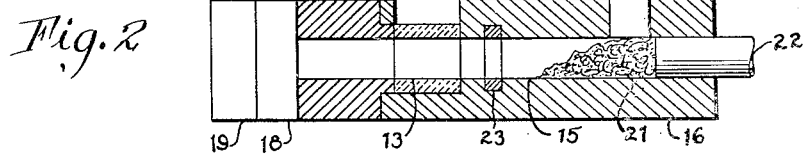
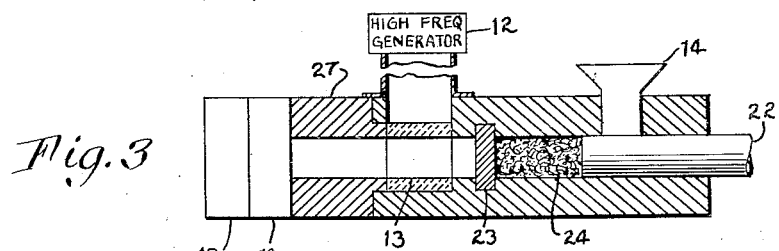
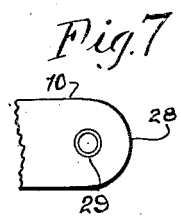
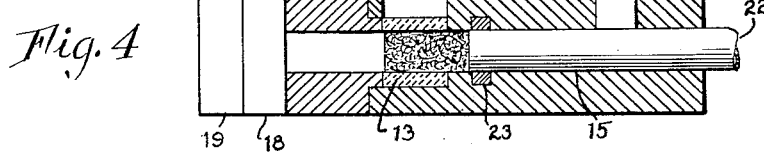
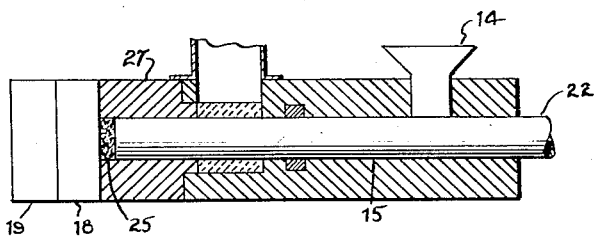
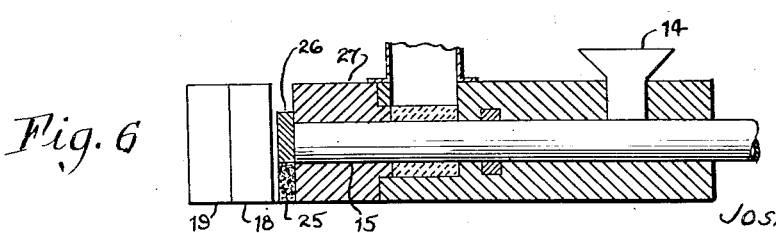
INVENTOR
JOSEPH V. BERTRAND
BY
Hammond & Littell
ATTORNEYS Patented Jan. 9, 1951

2,537,182

UNITED STATES PATENT OFFICE 2,537,182

INJECTION MOLDING MACHINE

Joseph V. Bertrand, Brooklyn, N. Y., assignor to Hydropress, Incorporated, New York, N. Y., a corporation of Delaware Application September 23, 1946, Serial No. 698,763

7 Claims. (Cl. 18—30)

This invention relates to the dielectric heating of plastics and particularly to a machine and method for heating a thermoplastic or thermosetting material prior to injection molding.

As is well known, the heat conducting property of plastic materials is poor so that heating by conduction is not satisfactory. Inasmuch as it takes considerable time for transmission of heat from the source thereof to another part of the mass, this is especially disadvantageous in dealing with large masses of plastic such as is necessary for economical operation.

One of the objects of the present invention is to provide a method and apparatus for quickly and uniformly heating a plastic or other dielectric material about to be molded or heated for other purposes by the use of high frequency current in a heating chamber located within a wave guide.

One of the features of the invention is the use of a rectangular wave guide with a heating cylinder or chamber located transversely thereof.

Another of the objects of the invention is to provide a heating chamber especially adapted to inject thermosetting resins. The heating takes place in the heating chamber and the injection plunger moves the heated mass of plastic out of the ceramic or like material heating chamber and into a passage having walls of sufficient strength to withstand the high pressures developed as the forming operation on the plastic takes place. The forming may be accomplished by injection into a mold, extrusion, or any similar operation. The invention also is adapted for use wherever a heating of plastic is involved.

These and other objects, features, and advantages of the invention will become apparent from the following description and drawings which are merely exemplary.

In the drawings:

Fig. 1 is a fragmentary perspective sketch of a wave guide and feed bore.

Fig. 2 is a fragmentary sketch showing feeding of the plastic to the injection cylinder, parts of the machine being shown in section and the molds being shown in full.

Fig. 3 is similar to Fig. 2, showing compacting of the plastic material.

Fig. 4 is similar to Fig. 2 and shows the insertion of the compacted plastic material into the heating chamber.

Fig. 5 shows the injection operation following the operation of Fig. 4.

Fig. 6 shows the excess material being ejected upon completion of the molding operation.

Fig. 7 is a fragmentary view of a modified end of the wave guide.

Referring to Fig. 1, a rectangular hollow pipe type wave guide is shown at 10, the broken end 11 being connected to a source of high frequency electrical energy, said source being shown schematically at 12 (Fig. 3). The source of high frequency energy preferably is above 150 megacycles per second and may be as high or higher than 500 megacycles per second such as can be generated in a device known as the Resnatron capable of generating over 50 kilowatts per tube which is a high power U. H. F. oscillator-amplifier tetrode.

A ceramic or other type of relatively low dielectric loss heating cylinder or chamber 13 is provided transverse of wave guide 11, said cylinder being located in relation to the standing waves therein so as to produce the desired heating effect on a plastic material therein. The cylinder preferably is located a quarter wave length from the closed end of the guide. As an example of a suitable material, steatite, fuzed quartz, or "Pyrex" glass can be used for the heating cylinder and the cylinder may be made with walls of sufficient thickness to withstand the pressures involved. As previously discussed, the apparatus can be arranged so that high pressures will not be placed upon the plastic while it is in the heating chamber.

The wave in the wave guide also should be continuously changed in position so as to evently heat the entire cross section of the plastic in the chamber. This may be accomplished in various manners such as by connecting a modulating low frequency source to the high frequency generator.

As an example of a method whereby the rectangular wave guide with a transverse heating cylinder may be used, reference is made to Figs. 2 to 6 wherein hopper 14 can be used to feed a plastic to the passage 15 in the main machine frame 16 leading to heating chamber 13. The rectangular wave guide is diagrammatically shown at 17 having a transverse heating chamber 13 similar to that seen in Fig. 1. The dies, molds, or other shaping devices are diagrammatically shown at 18 and 19, there being a suitable injection nozzle (not shown in Figs. 2 to 6) similar to that seen at 20 in Fig. 1.

In Fig. 2, the current is off and the plastic material to be heated is indicated at 21 with the injection plunger 22 in a retracted position. Transverse slide 23 is shown with an opening therein registering with passage 15. The slide is operated to a closed position (Fig. 3) so that when the plunger 22 is first advanced, the loose plastic granules 21 of Fig. 2 will be compacted as seen at 24 (Fig. 3) against the face of slide 23. Following the compacting action, the slide 23 is moved so that the opening therein again registers with passage 15 and further movement of injection plunger 22 will move the mass of compacted plastic to the position shown in Fig. 4 within the heating chamber 13.

At this time, the high frequency current is turned on for the required length of time to heat the plastic to the proper temperature for injection. It is noted that the end of plunger 22 is not within the heating cylinder so that the plastic adjacent thereto will not stick to the end of the plunger. The cylinder and guide is arranged such that the waves in the heating chamber will not reach to the end of the plunger so that there will be a layer of relatively cool plastic adjacent the end of the plastic. The bore diameter is made such that waves will not extend any appreciable distance outside of the wall line of the wave guide along the bore leading to or from the heating chamber. Following the heating operation, the plunger 22 (Fig. 5) is again advanced so that the heated plastic is injected into the molds 18 and 19, the plunger being stopped so that the relatively cold excess plastic 25 stops outside of the dies. The walls of passage 26 may be made such that they will withstand the pressure exerted thereon. For this reason, it is not essential that the walls of the heating chamber be exceptionally strong.

The molds 18 and 19 may be withdrawn (Fig. 6) from in front of the passage 15 and a slug ejector wiper 26 caused to remove the excess plastic slug 25 from the end of the plunger and clean the plunger to thus prepare the apparatus for the next molding operation.

The wave guide preferably is rectangular but may be any other suitable shape. The passage through the guide constituting the heating chamber also may have any desired shape.

It is apparent that other cycles of operation may be used and various forms of injecting molding or heating devices employed. The heating apparatus and method of using a transverse cylinder in a rectangular wave guide may be used for purposes other than injection molding, and a screw or other feeding means than a reciprocable plunger can be used.

The rectangular wave guide 28 (Fig. 7) may be terminated in an end wall having a radius equal to one-quarter of a wave length. In this case, the heating chamber 29 has its axis located at the center of the radius.

As another method of operation, a metal slug such as a steel, lead, or copper disc can be fed in front of the plunger to protect the same and serve as a cleaner for the cylinder, the metal slug being ejected at the point wherein the excess plastic slug of Fig. 6 is ejected. A plastic cup such as one made of polystyrene also may be fed in front of the plunger each time and removed at the end of the stroke thereof. Where necessary, a cleaner for the end of the plunger and the circumference thereof may be employed as well as a cleaner for the cylinder.

A still further method of operation is to briquette the plastic before it is inserted in the bore of the machine which will eliminate the compacting action in the bore.

Also after the plastic has been compacted, the plunger may be retracted and some loose plastic added which will be between the plastic mass and the plunger end and will not become compacted in the same manner as the previously briquetted mass inasmuch as but little pressure is necessary to move the plastic into the heating chamber.

It is apparent that the briquetting may be carried in a bore which also is the wave guide, energy being fed to said bore through the feed passage or otherwise. The current can be turned on when the plunger is retracted after the briquetting operation and then the loose plastic added so that it will remain between the plunger and compacted heated plastic and not be of the same temperature as the highly heated compacted plastic. When the electrical energy is fed to the wave guide through the feed passage, the plunger preferably is made of a low loss dielectric material so as not to shut off the energy being fed.

It is to be understood that changes may be made in the details of the construction and method of operation without departing from the spirit of the invention as defined in the appended claims.

I claim:

1. In an injection molding machine, a rectangular shaped wave guide having a longitudinally extending axis, a heating chamber having walls of a low loss dielectric material defining a passage extending transversely relative to said axis and across said wave guide, an injection plunger device for feeding plastic to said passage and through said chamber, and means to connect a source of high frequency electrical energy of over about 150 megacycles per second to said wave guide so that plastic in said heating chamber passage in said wave guide can be heated.

2. In a machine of the character described, a rectangular shaped wave guide having a longitudinally extending cavity and axis, a heating chamber having walls of a low loss dielectric material defining a passage extending transversely relative to said axis and across said wave guide, an injection plunger device having a bore for feeding plastic to said passage of said chamber, gate means connected to said bore against which plastic is compacted by said plunger before it is fed to said chamber, and means to connect a source of high frequency electrical energy of over about 150 megacycles per second to said wave guide so that plastic in said heating chamber passage in said wave guide can be heated.

3. In a machine of the character described, a wave guide having a longitudinally extending cavity and axis, a heating chamber passage extending transversely relative to said axis and across said guide, a feed plunger arrangement having a bore connected to said passage, means to feed plastic to be heated in front of said plunger in said bore, means to feed a mass of material other than said plastic to be heated in said bore between said plunger and said plastic to be heated, and high frequency electrical energy means to energize said wave guide so as to heat said plastic to be heated in said chamber without heating said mass of material.

4. In a machine of the character described, a rectangular shaped wave guide having a longitudinally extending cavity with a closed end, means to connect a source of high frequency electrical energy to said guide, a low loss dielectric wall heating chamber having a passage extending transversely across the cavity of said wave guide at a distance substantially one quarter wave length of the high frequency electrical energy from the closed end of said guide.

5. In a machine of the character described, a rectangular shaped wave guide having a longitudinally extending cavity with a closed cylindrically shaped end, means to connect a source of high frequency electrical energy to said guide, a low loss dielectric wall heating chamber passage extending tranversely across the cavity of said wave guide, the axis of said passage being located substantially at the center of the radius of said cylindrical closed end, said radius being equal to about one-quarter wave length of said high frequency.

6. Apparatus for dielectrically heating plastic comprising a dielectric heating chamber located in a wave guide cavity, a low loss dielectric plunger reciprocable in a feed bore connected to said heating chamber for feeding plastic to said chamber, said heating chamber being an extension of said feed bore, and high frequency electric current means connected to said heating chamber through said feed bore, whereby said plastic is heated in said heating chamber when said wave guide is energized by feeding high frequency electrical energy current through said feed bore to said wave guide cavity.

7. In a molding machine, the combination comprising a wave guide having a longitudinally extending cavity and axis, a heating chamber having a passage extending tranversely relative to said axis and across said wave guide, a feed plunger arrangement having a plunger and a bore connected to said passage, means to feed plastic to be heated in front of said plunger, means operating said plunger feeding plastic into said heating chamber passage, means for connecting shaping means to the heating chamber, and means connecting a source of high frequency electrical energy of over about 150 megacycles per second to said wave guide, so that plastic in said heating chamber passage in said wave guide can be heated and thereafter shaped.

JOSEPH V. BERTRAND.

REFERENCES CITED

The following references are of record in the file of this patent:

UNITED STATES PATENTS

| Number | Name | Date |
|---|---|---|
| 2,151,157 | Schelkunoff | Mar. 21, 1939 |
| 2,191,882 | Ernst et al. | Feb. 27, 1940 |
| 2,197,122 | Bowen | Apr. 16, 1940 |
| 2,271,063 | DeMattia | Jan. 27, 1942 |
| 2,364,526 | Hansell | Dec. 5, 1944 |
| 2,398,318 | MacMillin et al. | Apr. 9, 1946 |
| 2,398,606 | Wang | Apr. 16, 1946 |
| 2,411,254 | Frank | Nov. 19, 1946 |
| 2,427,094 | Evans | Sept. 9, 1947 |
| 2,436,999 | MacMillin et al. | Mar. 2, 1948 |

OTHER REFERENCES

"Electronic Torch," Welding Engineer, December 1945, page 90.